United States Patent
Wahlgren

(10) Patent No.: US 6,365,205 B1
(45) Date of Patent: Apr. 2, 2002

(54) PROCESS OF MAKING A DAIRY PRODUCT

(75) Inventor: Lena Wahlgren, Ry de bàck (SE)

(73) Assignee: Van den Bergh Foods Co., Lisle, IL (US)

( * ) Notice: Subject to any disclaimer, the term of this patent is extended or adjusted under 35 U.S.C. 154(b) by 0 days.

(21) Appl. No.: 09/362,398

(22) Filed: Jul. 28, 1999

Related U.S. Application Data

(62) Division of application No. 08/766,216, filed on Dec. 12, 1996, now abandoned.

(30) Foreign Application Priority Data

Dec. 14, 1995 (EP) .............................. 95203490

(51) Int. Cl.$^7$ ............................ A23L 9/12; A23L 9/123
(52) U.S. Cl. ............................ 426/34; 426/36; 426/42; 426/43; 426/580; 426/582
(58) Field of Search ............................ 426/34, 36, 42, 426/43, 580, 582

(56) References Cited

U.S. PATENT DOCUMENTS 3,929,892 A  12/1975  Hynes et al.

FOREIGN PATENT DOCUMENTS

| DE | 2 146 955 | 9/1970 |
| GB | 2 056 839 | 3/1981 |

OTHER PUBLICATIONS

KraftcoCorp., Derwent abstract, abstracting DE 2 146 955 (1997).

Food Product Development, vol. 9, No. 9, 1975, "Development of cheese–flavored dairy spreads with controlled fat content".

Database FSTA, P1792, SU 789 092 (Butin et al.), Dec. 1980.

Milchwissenchaft, vol. No. 40, 1985, pp. 193–196, "*Milk gel structure. Electron microscopy of why protein–based cream cheese spread*".

Journal of Dairy Science, vol. 68, Mo. 11, 1985, pps. 2835–2839, "*Sensory evaluation of an all–dairy formulated cream–type cheese produced by a new method*".

2nd Cheese Symposium, 1990, pps. 31–43, National Dairy Products Centre.

Deutsche Molkerei Zeitung DMZ, vol. 109, No. 18, Munchen De, pp. 538–543 "*Einfluss von molkenprotein-zusagtzen auf die Strukturausbildung von frischkasezuberei-tungen*".

*Primary Examiner*—Helen Pratt
(74) *Attorney, Agent, or Firm*—Gerard J. McGowan, Jr.

(57) ABSTRACT

A water continuous dairy product is provided that is suitable for cold and hot use and that is stable when incorporated in hot or sour food dishes. It has a dry matter content of 25–40%, a fat content of 13–27%, a protein content of at least 4.5% and a pH of 4.2–5.2. It can be prepared by a process that comprises acidifying a cream having a fat content of at least 25% and a non-fat milk solids content of at least 6.5% to cause the pH of the cream to become 4.0–5.2 and preparing a mixture comprising 30–70% of the acidified cream and 30–70% of fresh acid-coagulated curd having a pH of 4.2–5.2.

Preferably the mixture is homogenized.

14 Claims, No Drawings

PROCESS OF MAKING A DAIRY PRODUCT

This is a divisional of Ser. No. 08/766,216 filed Dec. 12, 1996, now abandoned.

The invention relates to a process for preparing a water-continuous dairy product and to a product obtainable by the process.

Water continuous dairy products such as quark and other fresh cheeses, cream, creme fraiche, etc. can be used for many different applications. They can for example be spread on bread, on top of or instead of e.g. butter or margarine, they can be eaten as dessert or they can be used as ingredient in the preparation of other foods. However when using such dairy products in cooking, e.g. when incorporating them in hot or sour food preparations, often the dairy product proves to be unstable, i.e. it separates, thereby imparting an unpleasant appearance and mouthfeel to the food preparation. Creme fraiche is often used for cooking because it is relatively stable and the risk of such separation occurring is fairly small. However, the fat content of creme fraiche is rather high, typically about 35% or more. When we evaluated a reduced fat creme fraiche product having a fat content of 17%, we found it was not stable in cooking but it often separated when including it e.g. in sour sauces or hot dishes.

We have now found a way to overcome this problem. Accordingly the invention provides a process for preparing a water continuous dairy product suitable for use in cooking, comprising the steps of A acidifying a cream having a fat content of at least 25% and a non-fat milk solids content of at least 6.5% to cause the pH of the cream to become 4.0–5.2, preferably 4.0–4.9, more preferably 4.1–4.6

B preparing a mixture comprising 30–70% of the acidified cream and 30–70% of fresh acid-coagulated curd having a pH of 4.2–5.2, preferably 4.2–4.9, more preferably 4.4–4.7

C optionally, homogenising the mixture such that the product has a dry matter content of 25–40%, a fat content of 13–27%, a protein content of at least 4.5% and a pH of 4.2–5.2, preferably 4.2–4.9, more preferably 4.4–4.8.

Preferred embodiments of the process are given in claims 2–9.

The invention also provides a water continuous dairy product suitable for use in cooking, obtainable by the present process, having a dry matter content of 25–40%, a fat content of 13–27%, a protein content of at least 4.5% and a pH of 4.2–5.2, preferably 4.2–4.9, more preferably 4.4–4.8, that is stable when incorporated in a hot or sour food preparation. Preferred embodiments of the product are given in claims 11–13.

Deutsche Molkerei Zeitung vol. 109 no. 18 page 538–543 describes the influence of protein additives on the structure of fresh cheese.

U.S. Pat. No. 3,929,892 describes the production of a cream cheese type product from dairy ingredients including cottage curd.

Food product development vol 9. no.9 1975 pages 68–74 describes the development of cheese flavoured dairy spreads.

None of these documents describe the particular process steps as outlined above nor products which can be obtained through such a process.

The present product is not only suitable for cooking. It can also be spread on bread, used for cold dipping e.g. with snacks, eaten as dessert, if so desired e.g. in combination with fresh or preserved fruits, used in bakery products, e.g. as a layer in or on top of cakes, etc. The product has a pleasant taste, e.g. not very different from creme fraiche, but with an extra, fresh touch. It typically has a nice smooth texture. Although the product will usually not be airated, it can have a consistency resembling that of firm, whipped cream. We found the product particularly attractive for use in a wide variety of warm and cold cooking, for example in making sauces, soups and casseroles. We found that the product can be stable even under demanding circumstances, e.g. when used in soups that still need some boiling or when used in tomato/vinegar based dressings having a very low pH. Under such conditions we found the reduced fat creme fraiche was not stable, it separated.

The cream employed in step A of the process has a non-fat milk solids content of at least 6.5%. This is higher than is commonly present in dairy cream. Usually regular dairy cream from cow's milk, prepared e.g. by separating whole milk into cream and skimmilk, which may be standardized e.g. by recombining cream with some skimmilk to obtain a fat content of e.g. 40%, optionally in combination with homogenisation, contains about 5% non-fat milk solids. Preferably the present cream is derived from cow's milk, but its non-fat milk solids content is raised. This is preferably done by combining 95–99% of a dairy cream having a usual non-fat milk solids content, with 1–5% milk solids, preferably skimmilk powder, and subjecting the mixture obtained to homogenisation. Before homogenisation, the mixture can be left to stand for some time, e.g. with gentle stirring to allow the milk solids to dissolve. By dairy cream is meant cream obtained by separating fat containing milk, preferably cow's milk, into a high fat portion, cream, and a low fat portion, usually skimmilk. The cream may be standardized, e.g. by mixing back in some skimmilk, and/or homogenized. Such dairy cream typically has a non-fat milk solids content lower than the non-fat milk solids content of the milk from which it is prepared. In the present process, preferably skimmilk powder is dispersed in dairy cream to obtain the desired non-fat milk solids content, and the resulting mixture is homogenised. Homogenisation can be done using a homogenizer as commonly used in the dairy industry, e.g. using a single or multi-stage homogenizer operating at a pressure of 30–400 bar. The mixture may be pasteurised, e.g. at 70° C. before or after the homogenisation. The resulting cream should have a fat contents of at least 25%, preferably it is 30–50%, especially 35–45%. The cream used in step A of the process preferably has a non-fat milk solids content of 7–12%, especially 7–9%.

To raise the milk solids content of the dairy cream, as an alternative to skimmilk powder for example sweet and/or sour buttermilk powder can be used, but preferably skimmilk powder is used.

Alternatively, the cream of step A of the process may consist of or comprise artificial cream, by which is meant cream in which part or all of the fat consists of vegetable oil or fat. Such artificial creams are well known in the art. Preferably, however, the cream in step A of the process is cream derived from milk of mammals, more preferably milk of ruminants, in particular cows' milk.

It is essential for the pH of both the acidified cream and the curd, and also that of the end product to be low enough for coagulation of caseins, i.e. 5.2 or lower. On the other hand, to obtain optimal taste and texture properties, the pH should not be too low. We found that the pH of the acidified cream may be as low as 4.0 but should not be lower, while the pH of the curd and of the endproduct should not be below 4.2.

The cream in step A of the process may be acidified chemically, e.g. using lactic acid. Glucono delta lactone can also be used. Preferably however the cream is acidified with a lactic acid culture.

The lactic acid culture, i.e. a culture of bacteria capable of converting lactose into lactic acid, is added to the cream and the cream is kept at a suitable temperature to allow the fermentation to proceed and the pH to reduce. Preferably, the culture used is a yoghurt culture, e.g. a thermophilic culture comprising e.g. *L. bulgaricus* and *S. thermophilus*. As used herein the expression yoghurt culture includes yoghurt comprising live lactic acid bacteria. The culture is suitably added in an amount of 0.5–4%, preferably 1–3%, calculated on the weight of the cream. When using a common yoghurt culture, suitably the incubation temperature is about 45° C., and the desired pH of 4.0–5.2, preferably 4.0–4.9, more preferably 4.1–4.6 will be reached in 4–5 hours. The fermentation can then be stopped by raising the temperature e.g. to 58–60° C. for 5 minutes.

In step B of the process, a mixture is prepared comprising 30–70% of the acidified cream and 30–70% of a fresh acid-coagulated curd having a pH of 4.2–5.2, preferably, 4.2–4.9, more preferably 4.4–4.7. By an acid-coagulated curd is meant a curd in which the caseins have been caused to coagulate primarily by the action of acid. In the curd preparation a small amount of rennet may be employed to improve the texture of the curd or to facilitate its preparation. The indication fresh means that the curd has not been matured, as is commonly done with renneted curds e.g. for making matured cheeses like Gouda or Camembert. How to make fresh acid-coagulated curds is well known in the art. A suitable description is given e.g. by Guinee in 2nd Cheese Symposium, Nov. 22nd and 23rd 1990, National Dairy Products Centre, Moorepark, Fermoy, 31–43. The curd preferably is a low fat curd having a fat content of less than 5%, especially 0–3%. Particularly good results are obtained with the use of quark, especially low fat quark as the fresh acid-coagulated curd. The expression quark includes quark-equivalents by which are meant products that may not meet the legal definition of quark, e.g. because of the way they are prepared or their precise composition, but that are functionally and sensorically not essentially different from quark. Preferably, however, regular dairy quark is used, e.g. as described by Guinee cited above, or by J. G. Davis in Cheese, volumes I and III, Churchill Livingstone, London, 1965 and 1976. The curd preferably has a dry matter content of 14–32%, more preferably of 15–22%. The protein content of the curd preferably is 10–20%, especially 12–18%. In step B of the process e.g. some water and/or skimmilk can be included in the mixture to adapt the mixture composition to the composition desired for the end product. Preferably however the composition of the cream and of the curd and their mixing ratio are chosen such that such inclusion of e.g. water in step B of the process is not necessary. Preferably in step B 45–60% of the acidified cream is combined with 40–55% of the fresh acid-coagulated curd to obtain the mixture.

The mixture in step B can be prepared e.g. by mixing the composition in a tank with a mixing device, e.g. a ribbon mixer. Preferably, subsequent to step B the product is kept at a temperature for a period of time sufficient to at least pasteurize it. The product from step B, preferably after pasteurisation, can then be packed. The product so prepared, may show syneresis. Syneresis is different from the separation during cooking described above. Syneresis is the release of aqueous fluid from the main body of the water coutinuous dairy product in its pack. Contrary to the separation during cooking, syneresis does not adversely affect the quality of food preparations made with the dairy product.

However, especially non-professional customers may not like syneresis. To reduce this phenomenon it is therefore prefered to subject the mixture to homogenisation. Such homogenisation also contributes to the smoothness of the product.

The homogenisation is preferably done, applying a pressure of 30–400 bar, more preferably 40–150 bar. Preferably the homogenisation is done at an elevated temperature, e.g. of at least 60° C. Preferably before and/or after the homogenisation in step C, the product is kept at a temperature for a period of time sufficient to at least pasteurize it. For example the mixture of step B can suitably be heated to 65–80° C., preferably 70–75° C. and homogenized at that temperature while the total holding time at that temperature before and after homogenisation can e.g. be 10 minutes to 4 hours. The product can then be cooled down and packed but preferably the product is packed while still hot. The packed product is then cooled down, preferably before the primary packs are combined in secondary packs such as outers to allow the cooling to proceed quickly. Good results are obtained by e.g. passing the primary packs through a cooling tunnel to reduce the temperature to below about 45° C., preferably below about 35° C. The cooled down product can then be packed in secondary packaging e.g. outers or shrink-wrapped trays. The secondary packs can be palletized and stored e.g. at 5–10° C., before shipment.

Small amounts of other ingredients may be incorporated in the product, e.g. salt, flavour, spices or other taste and flavour imparting substances, preservative etc. Such ingredients can suitably be incorporated e.g. in or subsequent to step B of the process. Preferably however such ingredients are incorporated before homogenisation and pasteurisation of the product. If it is desired to include discrete particles in the product, e.g. herbs, pieces of nuts or fruit and the like, such particles are best incorporated after the homogenisation. Then preferably the holding time at elevated temperature is chosen such that these added particles are also pasteurised. Alternatively, such particles can be pasteurised separately before inclusion in the product.

Stabilizers such as gelatin, carrageenan, pectin, guargum etc, may also be incorporated in the product. Such stabilizers can reduce or prevent syneresis. They can be used if no homogenisation is applied but they may also be employed in combination with homogenisation. The amount of stabilizer preferably does not exceed 3%. Typically an amount of 0.1–2% will be adequate, an amount of 1% or less being especially preferred. However the use of such stabilizers is not necessary and very good product can be obtained without using such stabilizers.

Preferably the process is carried out such that the resulting dairy product has the following compositional properties:

|  | Preferred: | More preferred: |
| --- | --- | --- |
| protein | 5–12% | 6–10% |
| fat | 14–25% | 16–22% |
| dry matter | 27–35% | 29–33% |

Except for the contents of deliberately added materials such as pieces of nuts or fruit, the protein and fat contained in the product preferably originate from dairy milk. To prevent the product from getting an undesirable taste, the lactose content of the product should preferably not exceed 7%, more preferably it is kept below about 6%. The texture of the product is preferably smooth, the particle size as measured with a microscrew preferably being less than 50

μm, more preferably less than 40 μm, especially less than about 30 μm. If larger particle sizes are obtained, this can normally be corrected by using a smoother curd as starting material, acidifying the cream to a slightly less low pH or renewing the culture used and/or by adapting the homogenisation step. The firmness of the product can suitably be characterised with a Stevens Texture Analyzer®, operated with a 12.7 mm φ rod, speed 2 mm/s, penetration depth 10 mm. Before measuring, the sample is conditioned 24 hours at the measuring temperature. Preferably, the Stevens value at 10° C. of the product is at least 100 g, more preferably 130–300 g, especially 150–250 g. Throughout this specification all parts, percentages and proportions are expressed by weight.

EXAMPLE 1

Dairy cream from cow's milk having a fat content of 40% was standardized with skimmilk. The resulting dairy cream contained 37% fat, 2% protein and 3% carbohydrate. 97 parts of this cream was blended with 3% low heat skimmilk powder, the mixture was left to stand with gentle stirring for 2 hours at 5° C., it was pasteurised at 70° C. and then passed through a homogeniser operated at 200 bar. The resulting cream contained 36% fat, 3% protein and had a non-fat milk solids content of 8%. It was cooled to 45° C. and inoculated with 2% yoghurt made by incubating skimmilk with a standard yoghurt starter culture and using the resulting yoghurt again to incubate skimmilk. When the pH reached 4.3 the cream was heated to 60° C. to inactivate the culture. 53 parts of the acidified cream was mixed with 47 parts quark having a fat content of 0.3%, a protein content of 13%, a dry matter content of about 17%, a carbohydrate content of 3% and a pH of 4.6. The mixture was heated to 70° C., 0.6 parts salt were mixed in and after a residence time of 30 minutes, the composition was passed through a homogenizer at 60 bar and the product was packed in tubs while still hot. The sealed tubs were passed through a cooling tunnel at the end of which the product temperature was about 35° C. The products were then packed in outers and stored at 5° C. The products were evaluated after 1 week.

The product contained 19% fat, 8% protein, 4% carbohydrate and 31% dry matter. It had a pH of 4.5, a Stevens value at 10° C. of 170 g and a particle size of 17 micron. In panel evaluation the product was tasted and spread on bread. It was found to be very good. The product was further evaluated by stirring it into boiling creamy mushroom soup and into a ketchup-like dressing having a pH of 3.8. In both cases the dairy product was stable while it made a very good taste contribution. To test the stability under even more extreme conditions, vinegar was added to the dressing until the pH was 3.8 again and the mixture was heated until it boiled. No separation occurred. The same test was done with a reduced fat creme fraiche product. It separated. The product according to the invention was also evaluated as a replacer of creme fraiche in a hot pasta dish containing smoked salmon and herbs. After inclusion of all ingredients, the food preparation was reheated in a microwave oven. The result was very good.

EXAMPLE 2

Water continuous dairy product was prepared as described in example 1, except that the end product composition was not homogenized or homogenized at 50 bar or at 100 bar.

All these products were acceptable. The non-homogenized product was the least preferred. The product homogenized at 50 bar was liked the most, it had the best appearance, consistency and mouthfeel.

The products were used in preparing Stroganoff sauce. The results were good in all three cases. Substantially no separation was observed. In contrast, Stroganoff sauce prepared with reduced fat creme fraiche exhibited severe separation.

EXAMPLE 3

Product was prepared as described in example 1 except that the product after homogenisation was cooled down by passage through a heat exchanger after which it was packed. The resulting product was good.

EXAMPLE 4

Product was prepared as described in example 1 except that in preparing the cream, in addition to the skimmilk powder, 1 or 2% caseinate, (calculated on the weight of the 37% fat cream) was included.

The resulting products were good. The incorporation of caseinate reduced syneresis but the texture of the resulting product was somewhat more coarse.

EXAMPLE 5

Product was prepared as described in example 1 except that in step B of the process a small amount of garlic powder and cheese flavour was incorporated. The resulting product was good. It was for example very suitable for spreading on bread or for incorporation in salad dressing.

EXAMPLE 6

Product was prepared as described in example 1 except that together with the salt, 0.5% gelatin calculated on the weight of the endproduct, dissolved in a small amount of water of 70° C. was incorporated. The resulting product was good. No syneresis was observed in the product.

The product was evaluated as a dessert together with fresh strawberries sprinkled with powder sugar. It was much appreciated.

EXAMPLE 7

Product was prepared as described in example 1 except that incorporation of salt and homogenisation were carried out without raising the temperature. The product was packed into tubs and then subjected to in pack pasteurisation.

The resulting product was acceptable but it showed more syneresis and the texture was more coarse compared with the product of example 1.

What is claimed is:

1. Process for preparing a water continuous dairy product suitable for use in cooking, comprising the steps of
   (a) acidifying a cream having a fat content of at least 25% and a non-fat milk solids content of at least 6.5% to cause the pH of the cream to become 4.0–5.2,
   (b) preparing a mixture comprising 30–70% of the acidified cream and 30–70% of fresh acid coagulated curd having a fat content of less than 5% and having a pH of 4.2–5.2,
   (c) optionally, homogenizing the mixture, such that the product has a dry matter content of 25–40%, a fat content of 13–27%, a protein content of at least 4.5% and a pH of 4.2–5.2.

2. Process according to claim 1 wherein the cream is prepared by combining 95–99% dairy cream having a fat content of 25–50% with 1–5% milk solids and homogenising the mixture.

3. Process according to claim 2 wherein the milk solids are skimmilk powder.

4. Process according to claim 1 wherein the cream is acidified with a lactic acid culture.

5. Process according to claim 4 wherein the lactic acid culture is a yoghurt culture.

6. Process according to claim 1 wherein the curd is quark.

7. Process according to of claim 1 wherein in step B, 45–60% of the cream is combined with 40–55 of the curd.

8. Process according to claim 1 wherein subsequent to step B, the product is kept at a temperature for a period of time sufficient to at least pasteurize it.

9. The process according to claim 1 wherein the pH of step (c) is 4.2–4.9.

10. The process according to claim 9 wherein the pH of step (c) is 4.4–4.8.

11. The process according to claim 9 wherein the pH of step (b) is 4.4–4.7.

12. The process according to claim 1 wherein the pH of step (a) is 4.0–4.9.

13. The process according to claim 1 wherein the pH of step (a) is 4.1–4.6.

14. The process according to claim 1 wherein the pH of step (b) is 4.2–4.9.

* * * * *